(12) United States Patent
Kumar et al.

(10) Patent No.: US 8,825,873 B2
(45) Date of Patent: Sep. 2, 2014

(54) USING A SERVICE DISCOVERY REQUEST TO FIND AVAILABLE DEVICES

(75) Inventors: Aarti Kumar, Cupertino, CA (US); Brian J. Tucker, San Jose, CA (US)

(73) Assignee: Apple Inc., Cupertino, CA (US)

( * ) Notice: Subject to any disclaimer, the term of this patent is extended or adjusted under 35 U.S.C. 154(b) by 507 days.

(21) Appl. No.: 12/715,247

(22) Filed: Mar. 1, 2010

(65) Prior Publication Data

US 2011/0213876 A1   Sep. 1, 2011

(51) Int. Cl.
*G06F 15/16* (2006.01)
*H04L 29/08* (2006.01)

(52) U.S. Cl.
CPC ........ *H04L 67/16* (2013.01); *G06F 2213/0038* (2013.01)
USPC ........... 709/227; 709/203; 709/217; 709/224; 455/41.2

(58) Field of Classification Search
CPC ...................................................... H04L 67/16
USPC ................. 709/203, 224, 227, 217, 223, 228; 455/41.2
See application file for complete search history.

(56) References Cited

U.S. PATENT DOCUMENTS

| | | | |
|---|---|---|---|
| 7,254,406 B2 * | 8/2007 | Beros et al. ................... | 455/41.2 |
| 7,590,097 B2 * | 9/2009 | Ekberg et al. ................ | 455/41.2 |
| 8,126,982 B2 * | 2/2012 | Nidd .............................. | 709/217 |
| 8,681,691 B2 * | 3/2014 | Shen et al. ..................... | 370/328 |
| 2004/0087274 A1 * | 5/2004 | Ekberg et al. ................ | 455/41.2 |
| 2004/0162804 A1 * | 8/2004 | Strittmatter et al. ............. | 707/1 |
| 2007/0021067 A1 * | 1/2007 | Kim et al. ..................... | 455/41.2 |
| 2007/0141984 A1 * | 6/2007 | Kuehnel et al. .............. | 455/41.2 |
| 2007/0264991 A1 * | 11/2007 | Jones et al. ................... | 455/420 |
| 2011/0213876 A1 * | 9/2011 | Kumar et al. ................. | 709/224 |

* cited by examiner

*Primary Examiner* — Ramy M Osman
(74) *Attorney, Agent, or Firm* — Park, Vaughan, Fleming & Dowler LLP; Anthony P. Jones (57) ABSTRACT

The described embodiments provide an electronic device for forming a network connection. In the described embodiments, a first electronic device determines that a network connection is to be made to at least one other electronic device to access a service on the other electronic device. The first electronic device then searches for available electronic devices that provide the service. Prior to finding a second electronic device that provides the service, the first electronic device receives a request from the second electronic device to access a related service provided by the first electronic device. In these embodiments, the request is received on a network connection formed by the second electronic device between the second electronic device and the first electronic device. Based on the received request, the first electronic device then uses the network connection formed by the second electronic device to communicate with the second electronic device.

20 Claims, 4 Drawing Sheets

USING A SERVICE DISCOVERY REQUEST TO FIND AVAILABLE DEVICES

BACKGROUND

1. Field

The described embodiments relate to techniques for forming network connections for an electronic device. More specifically, the described embodiments relate to a technique for using a service discovery request to find available devices when forming a network connection.

2. Related Art

Electronic devices are ubiquitous in modern life. For example, many people have laptop computers, smart phones, tablet computers, and/or other types of electronic devices they use for checking email, keeping track of friends in social networks, handling business transactions, making phone calls, and performing numerous other tasks. Many of these electronic devices include mechanisms for forming wired or wireless network connections with other devices to enable the electronic device to exchange data with the other devices. For example, these devices can include mechanisms for forming Bluetooth™ network connections (Bluetooth is a trademark of the Bluetooth SIG, Kirkland, Wash.), WiFi peer-to-peer network connections, wired/wireless personal-area-network (PAN) connections, and/or other wired or wireless network connections.

Generally, the formation of network connections between devices involves a number of well-defined operations. For example, to form a Bluetooth™ network connection, a device (device A) first makes an inquiry on an inquiry scan channel to determine if other devices are available for forming a Bluetooth™ network connection (i.e., an ad-hoc Bluetooth™ piconet). This operation involves device A using a radio interface to hop to each frequency in a predetermined set of frequencies. At each frequency, device A sends an inquiry at the frequency, and briefly await a response from any available devices before hopping to a next frequency. If a response is received from another device (device B), the response includes an identifier for the device (e.g., a device name and/or MAC address for device B). Device A can then use the received device identifier to perform a page scan in a separate page scan channel to obtain clock and channel hop sequence information that is used to facilitate subsequent communication with device B. Device A then uses the information obtained during the page scan to form a physical (wireless) link with device B.

After forming a wireless link between the devices, some devices perform service discovery operation to determine if a given service or profile is hosted on the other device. For example, in the above-described Bluetooth™ connection, the physical link formed between devices A and B includes a logical asynchronous connectionless link (ACL) that a service discovery application on device A can use to query device B to determine if a particular service or profile is provided by device B, along with information about how to access that service or profile.

The existing process of forming the network connection (i.e., physical link) and performing the service discovery has been optimized to enable a single "client" device to connect to and query a "server" to determine what services are provided by the server. However, in many modern electronic devices, this technique for service discovery may be inefficient because the devices may need separately configured network connections established in both directions. For example, in a Bluetooth™ system, multiple devices may connect to an ad-hoc piconet wherein no particular device performs the functions typically associated with a server, but where instead each device performs the functions of both a server and a client. For example, for some applications on portable electronic devices (e.g., game applications, file transfer applications, etc.), it is not clear which of the portable electronic devices would be a "server," and so application designers have created applications where both electronic devices perform some of the functions of a server. In such applications, the formation of the network connection and the service discovery protocol is bi-directional, meaning that each device separately performs the inquiry, paging, link formation, and service discovery operations to form a network connection between the devices. Unfortunately, the duplication of these operations can significantly increase the amount of time required to establish a network connection between the devices.

This problem becomes particularly apparent when the piconet includes three or more devices that must each separately connect to the other devices. In these cases, each device must separately form a connection with each other device, a process that can require a sufficient amount of time to be frustrating for the users of the devices.

SUMMARY

The described embodiments provide an electronic device that facilitates forming a network connection. In the described embodiments, during operation, a first electronic device determines that a network connection is to be made to at least one other electronic device to access a service on the other electronic device. The first electronic device then searches for available electronic devices that provide the service. Prior to finding a second electronic device that provides the service, the first electronic device receives a request from the second electronic device to access a related service provided by the first electronic device. In these embodiments, the request is received on a network connection formed by the second electronic device between the second electronic device and the first electronic device. Based on the received request, the first electronic device then uses the network connection formed by the second electronic device to communicate with the second electronic device.

In the described embodiments, when communicating with the second electronic device, the first electronic device is configured to use the network connection formed by the second electronic device. This can facilitate the first electronic device communicating with the second electronic device without performing some of the operations performed by existing electronic devices to find the second electronic device while searching for available electronic devices.

In some embodiments, when searching for available electronic devices, the first electronic device is configured to perform a scan a predetermined sequence of frequencies in a scan channel, by repeatedly: (1) hopping to a next frequency; (2) sending an inquiry message at the frequency; and (3) awaiting a response from another electronic device at the frequency for a predetermined time.

In some embodiments, upon using the network connection formed by the second electronic device to communicate with the second electronic device, the first electronic device stops the search for available electronic devices.

In some embodiments, while using the network connection formed by the second electronic device to communicate with the second electronic device, the first electronic device continues to search for other available electronic devices that provide the service.

In some embodiments, when using the network connection formed by the second electronic device to communicate with the second electronic device based on the received request, the first electronic device first determines that the request is directed to a service (or a service related to the service) provided by the first electronic device. The first electronic device then determines at least one device identifier for the second electronic device from the request. The first electronic device next uses the determined device identifier to communicate with the second electronic device.

In some embodiments, when communicating with the second electronic device, the first electronic device sends a request to the second electronic device to access the service on the second electronic device.

In some embodiments, a service includes one of a service provided by an application or an operating system on an electronic device or a profile provided by an electronic device. In these embodiments, when receiving the request, the first electronic device receives a service discovery request to access at least one of a service or a profile provided by the first electronic device.

In some embodiments, when forming the network connection, the first electronic device configures one or more subsystems in the first electronic device to communicate with at least one other electronic device.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description can be stored on a computer-readable storage medium. The computer-readable storage medium can include any device or medium (or combination of devices and/or mediums) that can store data structures and code for use by a computer system. For example, the computer-readable storage medium can include volatile memory or non-volatile memory, including flash memory, random access memory (RAM, SRAM, DRAM, RDRAM, DDR/DDR2/DDR3 SDRAM, etc.), read-only memory (ROM), magnetic or optical storage devices (e.g., disk drives, magnetic tape, CDs, DVDs), or other mediums capable of storing data structures or code. In the described embodiments, the computer-readable storage medium can be included in memory subsystem 104 (see FIG. 1) or in another of the subsystems in electronic device 100. Note that the computer-readable storage mediums herein described do not include transmission mediums.

Some or all of the methods and processes described in the following description can be embodied as program code that is stored in a computer-readable storage medium. When a computer system (e.g., electronic device 100) reads and executes the program code stored on the computer-readable storage medium, the computer system performs the methods and processes in the program code stored in the computer-readable storage medium.

Some or all of the methods and processes described in the following description can be included in hardware modules. For example, the hardware modules can include, but are not limited to, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits (e.g., general-purpose circuits in processing subsystem 102) that can be configured by executing instructions to perform the methods and processes.

Overview

The described embodiments include a mechanism for efficiently forming a network connection between a device and one or more other devices. In these embodiments, a first device that is attempting to form a network connection with available devices can recognize that a second device is attempting to form a similar type of network connection between the second device and the first device. The first device can then form a network connection between the first device and the second device without performing some of the operations that would otherwise be performed to find the second device and establish the network connection between the first device and the second device.

In the described embodiments, two electronic devices (see electronic device 100 in FIG. 1) can run an application that exchanges data between the devices. For example, in some embodiments, the application can be a game application, a file transfer application, or another application that transfers data with other devices. In these embodiments, each device forms a network connection to the other device to enable the transfer of data between the devices. Alternatively, the electronic devices can provide a different type of service or a profile (e.g., an audio profile, etc.), and each device can connect to the other device to access the service or the profile.

Generally, when forming the network connection, each device separately performs initial operations to find other devices that are available to form a network connection. When and if another device is found, the device forms a basic network connection with the other device. The device then uses the basic network connection to send a discovery request to the other device to determine if the device is hosting the service for which the device is searching or provides a given profile. If the other device responds affirmatively that the service or profile is provided, the device forms a corresponding network connection with the other device.

In the described embodiments, one of the devices (a first device) may complete the operation of forming a network connection with the other device (a second device) before the second device has completed the initial operations to find the first device (i.e., while the second device is still searching for available devices). In this case, upon receiving the query from the first device to determine if the second device is hosting the service, the second device can recognize the query as coming from a device that is attempting to set up a similar type of network connection. Upon recognizing this, the second device can establish a network connection from the second device to the first device using information from the query received from the first device. In some embodiments, this involves the second device communicating with the first device on a network connection previously formed by the first device. In some cases, the second device can also stop searching for other devices that provide the service.

Generally, in the described embodiments, when either of the devices sends a query, status update, request, and/or other signal/packet/data to the other device that can be used to identify a type of network connection to be formed, the receiving device can use the received signal/packet/data, etc. to determine that the sending device is attempting to form a given type of network connection and/or wants to form a network connection to use a particular type of service/profile or a service/profile related to a particular type of service/profile. If the receiving device is also attempting to form a similar type of network connection and/or attempting to form a network connection to use a similar service/profile, the receiving device can form a network connection from itself to the sending device without performing one or more of the operations ordinarily performed to find the sending device to form a network connection between the receiving device and the sending device. The receiving device can then use the network connection to determine which services the sending device is providing.

Although we use two devices as an example, in the described embodiments, three or more devices can form network connections with each other using a similar process. Specifically, any number of the devices can recognize that a query received from another device indicates that the device wants to form a given type of network connection, and can use the information in the query to set up a network connection with the querying device.

Electronic Device

Figure 1:
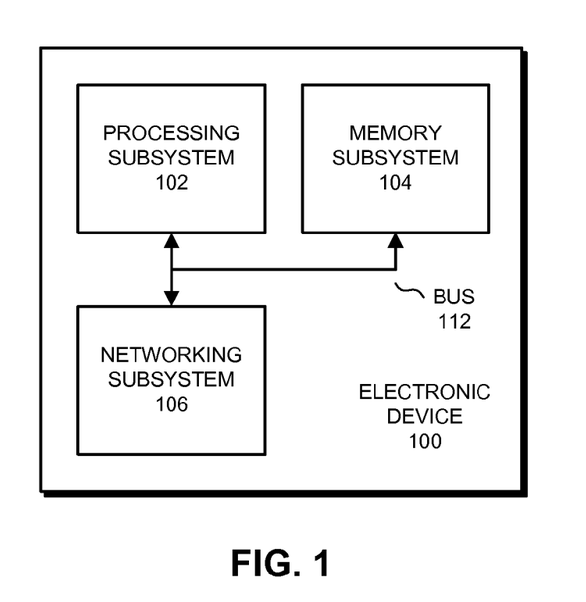
FIG. 1 presents a block diagram illustrating an electronic device in accordance with the described embodiments.

FIG. 1 presents a block diagram illustrating an electronic device 100 in accordance with the described embodiments. Electronic device 100 includes processing subsystem 102, memory subsystem 104, and networking subsystem 106.

Processing subsystem 102 can include one or more devices configured to perform computational operations. For example, processing subsystem 102 can include, but is not limited to, one or more microprocessors, ASICs, microcontrollers, or programmable-logic devices.

Memory subsystem 104 can also include one or more devices for storing data and/or instructions for processing subsystem 102 and networking subsystem 106. For example, memory subsystem 104 can include DRAM, flash memory, and/or other types of memory. In addition, memory subsystem 104 can include mechanisms for controlling access to the memory. In some embodiments, memory subsystem 104 includes a memory hierarchy that includes an arrangement of one or more caches coupled to a memory for electronic device 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by electronic device 100 as fast-access storage for often-used data, while the mass-storage device is used to store less frequently accessed data.

Networking subsystem 106 can include one or more devices configured to couple to and communicate on a wired and/or wireless network (i.e., to perform network operations). For example, networking subsystem 106 can include, but is not limited to, a Bluetooth™ networking system, a cellular networking system (e.g., a 3G/4G network), a universal serial bus (USB) networking system, a networking system based on the standards described in Institute for Electrical and Electronic Engineers (IEEE) 802.11 (i.e., an 802.11 wireless network), an Ethernet networking system, or a wired or wireless personal-area networking (PAN) system (e.g., an infrared data association (IrDA), ultra-wideband (UWB), Z-Wave, or a network based on the standards described in IEEE 802.15).

Networking subsystem 106 can include controllers, radios/antennas for wireless network connections, sockets/plugs for hard-wired electrical connections, and/or other devices used for coupling to, communicating on, and handling data and events on a wired and/or wireless network. In some of these embodiments, networking subsystem 106 can include one or more mechanisms for forming an ad-hoc network connection (e.g., an ad-hoc wireless PAN) with other devices.

Note that we describe forming a network connection in this description; generally, this terminology indicates using networking subsystem 106 to form a physical network connection (wired or wireless) between two or more devices. In the described embodiments, forming a network connection can involve performing one or more operations to enable communication on the physical network connection.

Within electronic device 100, the subsystems (i.e., processing subsystem 102, memory subsystem 104, and networking subsystem 106) are coupled together using bus 112. Bus 112 is an electrical connection that the subsystems can use to communicate commands and data among one another. Although only one bus 112 is shown for clarity, different embodiments can include a different number or configuration of electrical connections among the subsystems.

Although shown as separate subsystems in FIG. 1, in some embodiments, some or all of a given subsystem can be integrated into one or more of the other subsystems in electronic device 100. For example, as described above, one or more caches in memory subsystem 104 can be included in processing subsystem 102 and/or another of the subsystems. Although alternative embodiments can be configured in this way, for clarity we describe the subsystems separately.

Electronic device 100 can be any of a number of different types of electronic devices or combinations of electronic devices. Generally, these electronic devices include any device that can use a request received from another device to determine that the other device is a candidate for forming a network connection. For example, electronic device 100 can be a desktop computer, a laptop computer, a server, a media player, an appliance, a tablet computer, a subnotebook/netbook, a network appliance, a set-top box, a personal digital assistant (PDA), a smart phone (e.g., an iPhone, from Apple Inc. of Cupertino, Calif., an HTC Dream from HTC Corporation of Bellevue, Wash., or a Nexus One phone from Google Inc. of Mountain View, Calif.), a toy, a remote control, a set of headphones, a controller, or another device.

Although we use specific components to describe electronic device 100, in alternative embodiments, different components and/or subsystems may be present in electronic device 100. For example, electronic device 100 may include one or more additional processing subsystems 102, memory subsystems 104, and/or networking subsystems 106. Alternatively, one or more of the subsystems may not be present in electronic device 100.

In some embodiments, electronic device 100 may include one or more additional subsystems that are not shown in FIG. 1. For example, electronic device 100 can include, but is not limited to, a display subsystem, a media processing subsystem, an input/output (I/O) subsystem, a data collection subsystem, an audio subsystem, and/or an alarm subsystem.

Operating System

Figure 2:
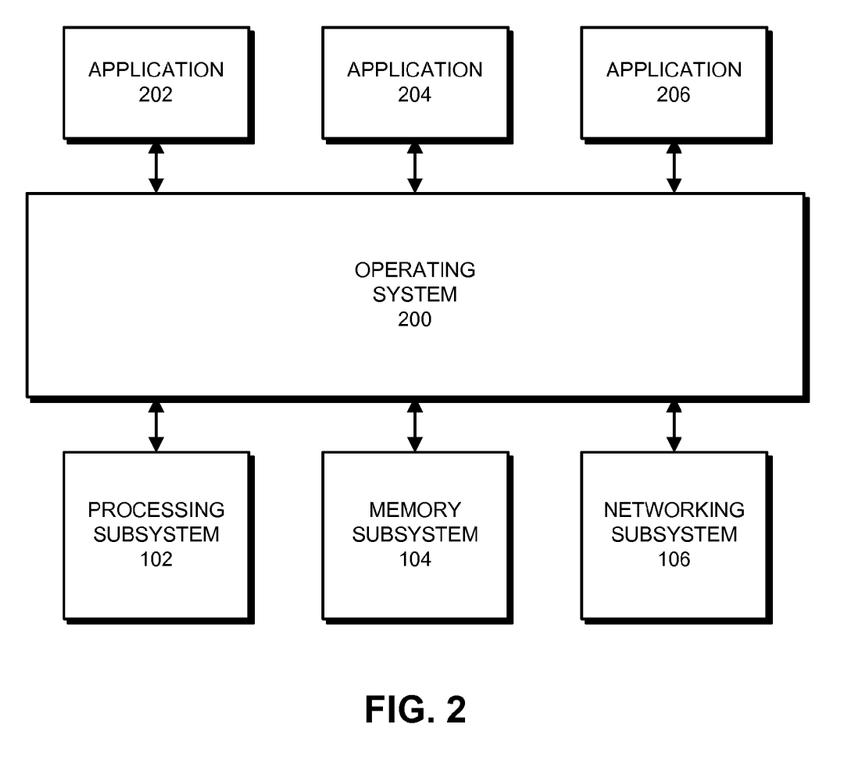
FIG. 2 presents an operating system executed by a processing subsystem in accordance with the described embodiments.

FIG. 2 presents an operating system 200 executed by processing subsystem 102 in accordance with the described embodiments. Generally, operating system 200 serves as an intermediary between system hardware in electronic device 100 (e.g., subsystems 102-106) and applications executed by processing subsystem 102, such as applications 202-206 (which can be, for example, a game application, a file transfer application, and a service discovery application, respectively). For example, operating system 200 can be, but is not limited to, the OS X operating system or the iPhone operating system from Apple Inc. of Cupertino, Calif.; the Windows operating system or the Windows Mobile operating system from Microsoft, Inc. of Redmond, Wash.; the Android operating system from Google Inc. of Mountain View, Calif.; or another full, mobile, or embedded operating system. Operating systems and their functions are known in the art and hence are not described in detail.

To manage the transfer of data to and from applications in electronic device 100 using an appropriate interface in networking subsystem 106, operating system 200 maintains one or more network protocol stacks (not shown) that each includes a number of logical layers. For example, the operating system can maintain an Internet protocol stack, which includes the link, Internet, transport, and application layers. As another example, the operating system can maintain a protocol stack based on the OSI model, which includes the application, presentation, session, transport, network, data-link, and physical layers. At each layer of the protocol stack, the operating system includes control mechanisms and data structures for performing the functions associated with the layer. The functions associated with each of the layers in the protocol stacks are known in the art and hence are not described in detail.

Networking Subsystem

Figure 3:
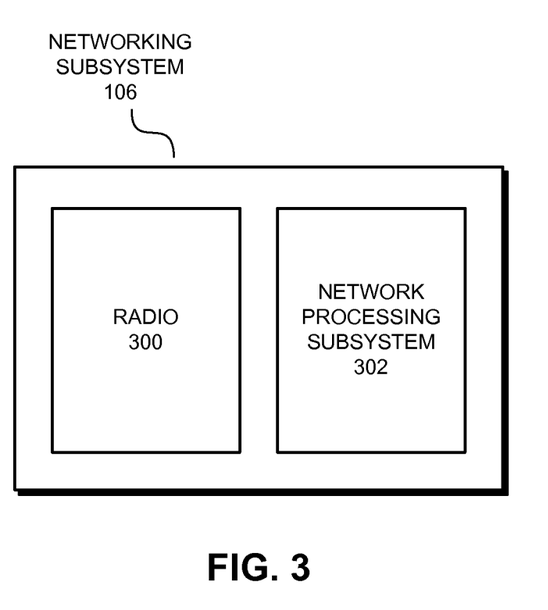
FIG. 3 presents a block diagram illustrating a networking subsystem in accordance with the described embodiments.

FIG. 3 presents a block diagram illustrating an exemplary networking subsystem 106 in accordance with the described embodiments. As can be seen in FIG. 3, networking subsystem 106 includes radio 300 and network processing subsystem 302. Radio 300 includes the controllers, radios/antennas, and/or other hardware devices used for coupling to, communicating on, and handling data and events on a wireless network.

Network processing subsystem 302 includes one or more processors, ASICs, controllers, and/or circuits for controlling the operation of radio 300 (i.e., for controlling the hardware devices in networking subsystem 106) and handling radio signals transmitted and received by radio 300. For example, in some embodiments, network processing subsystem 302 includes a link/connection manager mechanism, a service discovery mechanism, a link protocol mechanism, and/or other mechanisms.

In some embodiments, some or all of the mechanisms for controlling the operation of radio 300 in network processing subsystem 302 are implemented in software. In these embodiments, network processing subsystem 302 can include one or more processors and/or circuits for executing program code that implements the mechanisms.

For example, in some embodiments networking subsystem 106 includes a Bluetooth™ network interface. In some embodiments, the Bluetooth™ networking interface is divided into portions, one implemented in radio 300, and the other implemented in network processing subsystem 302. For example, radio 300 can include a controller stack that comprises the links for the Bluetooth™ interface, a link management protocol (LMP), and possibly a host/controller interface (HCI). In this embodiment, network processing subsystem 302 can include a host stack that comprises software and/or hardware mechanisms for implementing a logical link control and adaptation protocol (L2CAP), a service discovery protocol (SDP), a radio frequency communication protocol (RF-COMM), and other protocols.

Note that, although we describe radio 300 and network processing subsystem 302 as including the mechanisms for networking subsystem 106, in some embodiments, some or all of these mechanisms can be included elsewhere in electronic device 100. For example, in some embodiments, some or all of these mechanisms are included in operating system 200. Additionally, in some embodiments, one or more of applications executing on electronic device 100 (e.g., applications 202-206) can control some of the operations of networking subsystem 106.

Process for Forming Network Connections

Figure 4:
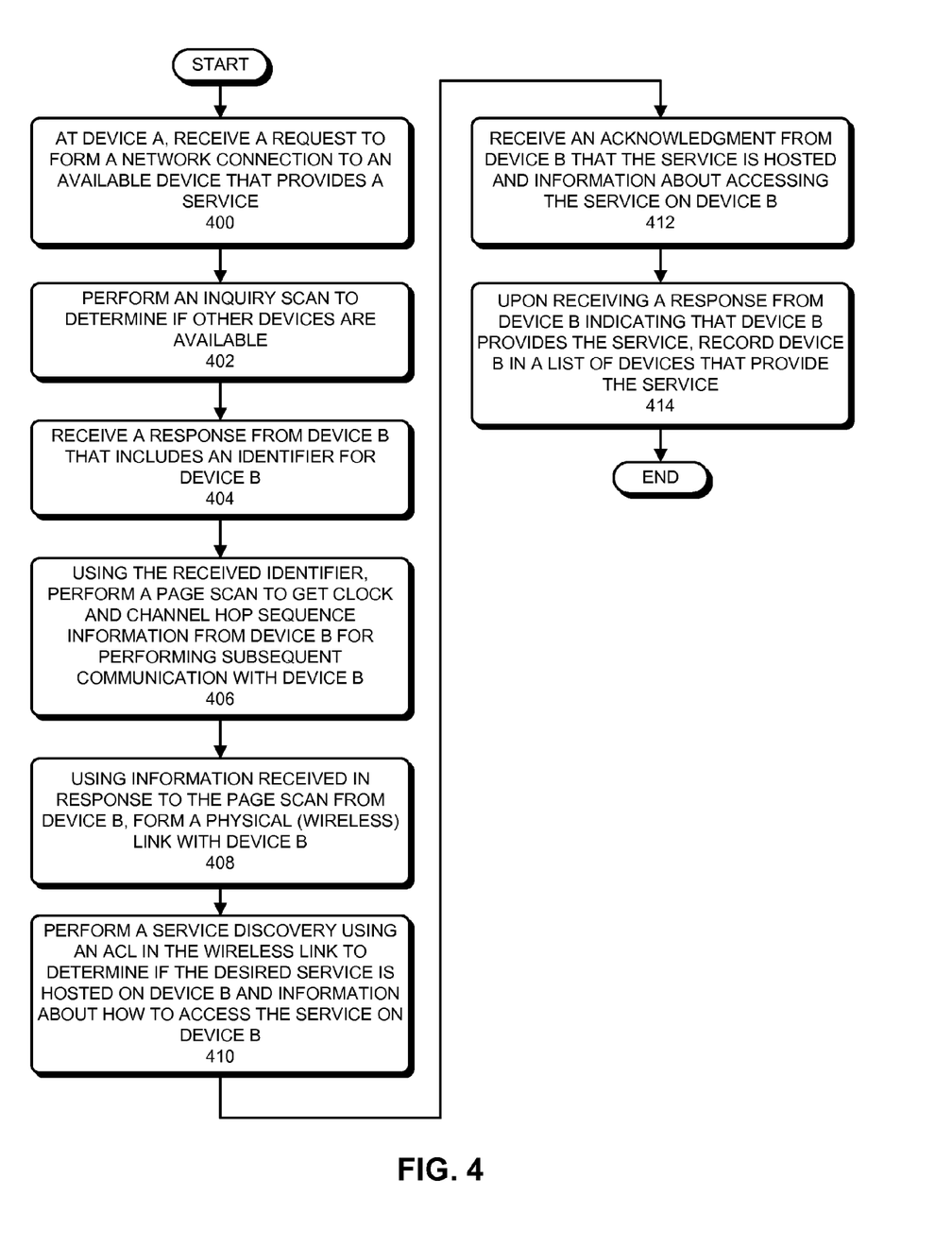
FIG. 4 presents a flowchart illustrating the formation of a network connection in accordance with the described embodiments.
Figure 5:
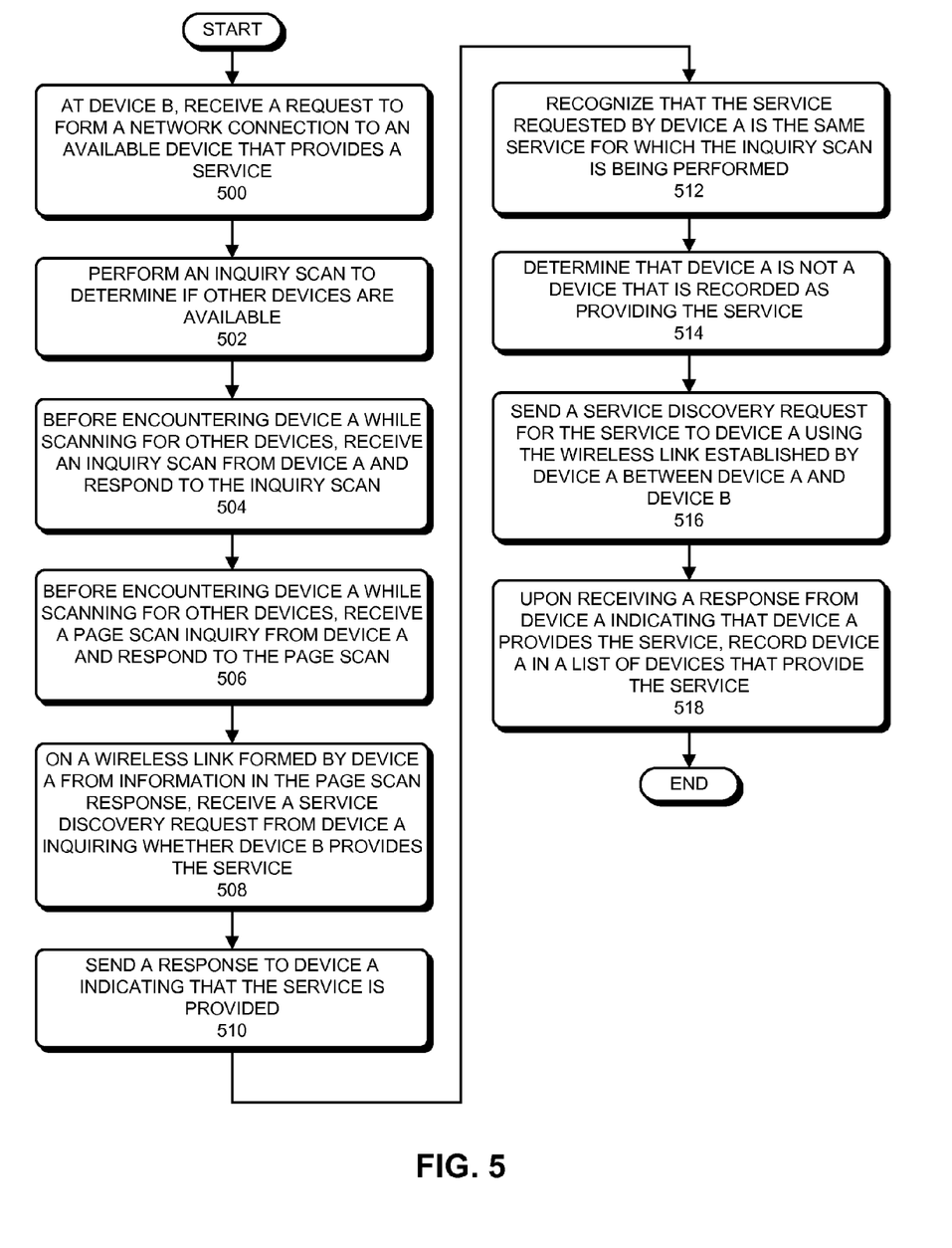
FIG. 5 presents a flowchart illustrating the formation of a network connection in accordance with the described embodiments.

FIG. 4 and FIG. 5 present flowcharts illustrating the formation of network connections between two devices in accordance with the described embodiments. In FIG. 4, the process is shown from the perspective of a first device, device A, while in FIG. 5, the process is shown from the perspective of a second device, device B.

Note that the network connection shown in FIGS. 4-5 is configured in each device separately (i.e., the network connection is separately formed by each of the devices). More specifically, device A configures mechanisms in networking subsystem 106 in device A to communicate with device B using a network connection, and device B separately configures mechanisms in networking subsystem 106 in device B to communicate with device A using a network connection. In these embodiments, therefore, it is generally not sufficient in communications between the devices for one device to establish a network connection (i.e., device A establishes a network connection, but device B does not); both devices should be configured before communication can take place.

In the process shown in FIG. 4, device A performs a set of operations to form a network connection with device B. However, in the process shown in FIG. 5, device B recognizes (via a service discovery request from device A) that device A has already set up a network connection, and subsequently uses the network connection formed by device A to communicate with device A. By recognizing that device A has already set up the network connection and using the existing network connection, device B can communicate with device A, but avoid performing some of the operations that would otherwise be performed to set up a network connection.

In the embodiments presented in FIGS. 4-5, devices A and B are each electronic devices 100 (e.g., smart phones, laptop computers, desktop computers, or other electronic devices). In some embodiments device A and device B are different types of devices. For example, device A can be a smart phone, while device B is a laptop computer or a tablet computer.

In the example in FIGS. 4-5, devices A and B are hosting a service (i.e., a game application) that uses a network connection to transfer data between the devices. However, in alternative embodiments, the service can be a different type of service (e.g., a file transfer application, a printing application, a social networking application, etc.). In addition, in some embodiments, the devices form the network connection for a different purpose. For example, the devices may form a network connection to access profile(s) on the devices (e.g., the advanced audio distribution profile (A2DP), the audio-video remote control profile (AVRCP), etc.).

In the embodiments shown in FIGS. 4-5, the network connection that is formed is a Bluetooth™ network connection (i.e., a network connection configured according to the standard described in IEEE 802.15). Although we use the Bluetooth™ network connection to illustrate the formation of a network connection, in alternative embodiments, other types of network connections can be formed using a similar process. For example, a WiFi peer-to-peer network connection or another wired or wireless network connection can be formed using a similar process.

In addition, the operations in the processes shown in FIGS. 4-5 are exemplary operations; in alternative embodiments, more, fewer, or different operations may be performed, or the operations may be performed in a different order. For example, in embodiments that form a Bluetooth™ connection, other and/or additional operations can be performed while forming a network connection. These operations can include operations that are known in the art.

During the processes shown in FIGS. 4-5, devices A and B are discoverable, meaning that the devices respond to inquiries received at a given frequency of an inquiry channel with information about the device (e.g., a MAC address or name of the device, a device class, etc.). In other words, each of the devices monitors the given frequency for inquiry requests and responds to received requests. In addition, the devices respond to page scans at a given frequency of a page scan channel with information about communicating with the device (e.g., clock phase and frequency hop sequence information). Moreover, these devices receive and respond to properly timed and formatted communications from other devices over a wireless link. For example, in an embodiment where a device hops through a sequence of receiving frequencies (e.g., in a Bluetooth™ device), a given device (e.g., device A) receives communications that identify "device A" (by address or device name) and are received at a current receiving frequency in a sequence of receiving frequency hops.

The process shown in FIG. 4 starts with device A receiving a request to form a Bluetooth™ network connection with another device that provides a service (step 400). As described above, the service in the other device transfers data between device A and the other device for a game application. In some embodiments, the request can come from the game application or from a service associated with the game application. For example, in some embodiments, an operating system on the device can provide the service that is used by the game application. In this embodiment, the game application can use an application programming interface (API) call to invoke the service in the operating system.

Device A then performs an inquiry scan to determine if other electronic devices are discoverable (step 402). During this operation, device A uses a radio 300 in networking subsystem 106 to hop from frequency to frequency in an inquiry scan channel, sending an inquiry at each frequency, and briefly awaiting a response from an available device, if any device is monitoring for inquiries at that frequency. For example, in some embodiments, device A hops to each of 79 frequencies (e.g., in 1 MHz steps starting at 2402 MHz) in the inquiry scan channel in sequence before starting over and re-scanning at each frequency. In alternative embodiments, device A can scan a predetermined subset of these frequencies.

Next, while scanning for other devices, device A receives a response from device B that includes an identifier for device B (step 404). For example, the response from device B can include a physical/MAC address for device B, a device class for device B, and/or a name for device B. Device A then uses the identifier for device B to perform a page scan in a separate page scan channel to get clock and channel hop sequence information from device B that is used to perform subsequent communication with device B (step 406).

Using the information obtained in response to the page scan from device B, device A forms a physical (wireless) link with device B (step 408). In these embodiments, forming a wireless link between device A and device B involves configuring radio 300 in networking subsystem 106 in device A so that the radio maintains a similar channel hop sequence and clock (timing for each hop) as a receiver in device B. Device A can then freely transmit data to and receive data from device B on the wireless link.

Devices A and B are configured so that a wireless link formed between the devices includes a number of special logical links that can be used to communicate particular types of information between devices A and B. For example, in some embodiments, the wireless link includes a logical asynchronous connectionless link (ACL) that is used to communicate configuration requests and responses from device A to device B.

Device A next sends a service discovery request on the ACL to determine if the desired service is hosted on device B and information about how to access the service on device B (step 410). Because device B hosts the service, device B responds to device A's inquiry with an acknowledgment that the service is hosted on device B and information about how to access the service (step 412). When device B responds to the service discovery request affirming that the service is supported on device B, device A adds device B to a list of providers of the service in device A (step 414).

In some embodiments, device A can then start to use the service. In these embodiments, using the service can involve a number of additional operations for configuring device A and/or device B for using the service. For example, the operations can include, but are not limited to, establishing other logical channels and performing other configuration operations for transferring data between the devices.

The process shown in FIG. 5 starts with device B receiving a request to form a Bluetooth™ network connection with another device that provides a service (step 500). As described above, the service in the other device transfers data between device B and the other device for a game application. In some embodiments, the request can come from the game application or from a service associated with the game application. For example, in some embodiments, an operating system on the device can provide the service that is used by the game application. In this embodiment, the game application can use an application programming interface (API) call to invoke the service in the operating system.

Device B then performs an inquiry scan to determine if other electronic devices are discoverable (step 502). During this operation, device B uses a radio 300 in networking subsystem 106 to hop from frequency to frequency in an inquiry scan channel, sending an inquiry at each frequency, and briefly awaiting a response from an available device, if any device is monitoring for inquiries at that frequency. For example, in some embodiments, device A hops to each of 79 frequencies (e.g., in 1 MHz steps starting at 2402 MHz) in the inquiry scan channel in sequence before starting over and re-scanning at each frequency. In alternative embodiments, device B can scan a predetermined subset of these frequencies.

Next, before encountering device A while scanning for other devices, device B receives an inquiry scan from device A (e.g., as described above with respect to step 404 in FIG. 4) and responds to the inquiry scan from device A (step 504). For example, device B can send physical address, device name, and/or device class information to device A to enable device A to initiate a page scan for further information about device B.

In response, and still before encountering device A while scanning for other devices, device B receives a page scan inquiry from device A (e.g., as described above with respect to step 406 in FIG. 4) and responds to the page scan inquiry (i.e., sends the corresponding information back to device A) (step 506). Next, after device A uses the information in the page scan response to form a physical wireless link with device B, device B receives a service discovery request from device A that inquires whether device B provides the service for transferring game data (step 508). Device B sends a response to device A to indicate that device B provides the service for transferring game data (step 510).

In addition to sending the response to device A, device B recognizes that the service requested by device A is the same as the service for which device B is scanning (step 512). More specifically, network processing subsystem 302, operating system 200, or another mechanism in device B monitors service discovery requests to determine the type of services that are being inquired about by other devices. If a given service request is requesting access to a service for which device B is currently attempting to form network connections with available device(s), device B makes a record of the service request.

Because device B detects that the service being inquired about in the service discovery request by device A is the same service for which device B is attempting to form a network connection with other devices, device B determines if device B already has a record of device A. Because device B has no record of device A (step 514), device B then sends a service discovery request for the service to device A using the wireless link established by device A between device A and device B (e.g., the network connection established in step 408 of FIG. 4) (step 516). More specifically, device B extracts information about device A from the service discovery request received from device A (e.g., the device name/address and/or other information for device A) and uses the extracted information to make a service discovery request from device B to device A using the network connection already formed by device A between device A and device B.

In some embodiments, this involves device B recognizing that device A is listening in a given channel at the frequency hop and clock sequence used by device B. In these embodiments, device B can then communicate with device A by forwarding communications to device A using the listening/communication sequence being maintained by device B.

When device A responds to the service discovery request affirming that the service is supported on device A, device B adds device A to a list of providers of the service in device B (step 518).

In some embodiments, device B can then start to use the service. In these embodiments, using the service can involve a number of additional operations for configuring device A and/or device B for using the service. For example, the operations can include, but are not limited to, establishing other logical channels and performing other configuration operations for transferring data between the devices.

In some embodiments, devices A and B maintain the above-described logical asynchronous connection link (ACL) for longer than existing systems to allow the other device time to: (a) recognize that a service discovery request is for a service for which the other device is presently searching; (b) respond to the service discovery request; and (c) send back its own service discovery request. For example, assume that device A has found device B and has sent a service discovery request to device B, but that device B has no record of device A. In the described embodiments, instead of awaiting only a response to a service discovery request and then stopping listening on the ACL, device A can continue to listen on the ACL for a predetermined time to enable device B to determine that device A is requesting the service being separately sought by device B (or a related service), and send a service discovery request (i.e., a separate service discovery request from device B to device A) using the existing ACL.

In the described embodiments, some or all of the existing process of inquiry scan, page scan, and service discovery associated with forming a Bluetooth™ network connection can be avoided. Instead of performing these operations, in the described embodiments a network processing subsystem 302 and/or an operating system 200 in an electronic device 100 can recognize when a service discovery request has been received that indicates that another device is seeking a network connection to a service similar to a service for which the device is presently looking. The device can use the wireless link formed by the other device (e.g., the ACL) to seek information about communicating with the service in the other device. In some embodiments, this can mean that operating system 200 can limit the amount of radio traffic.

In addition, in the described embodiments, recognizing other devices that are requesting similar services and using the requests to more quickly form network connections can mean that the final piconet is formed significantly more quickly than in existing systems. This effect becomes particularly noticeable as the number of devices increases beyond two. In piconets with larger numbers of devices, the formation process with each device takes a certain amount of time, during which a given device does not form network connections with other devices. Due to this delay, the formation of network connections with three or more other devices can be significant (20 seconds or more). Using the service requests received from other devices to shorten this discovery period as in the described embodiments can reduce this delay significantly (e.g., by 50% or more).

Note that in some embodiments, depending on the nature of the underlying service (i.e., if the service potentially includes connections to two or more other devices from the device), each of the devices can continue to scan for other available devices that are hosting the service. Thus, in these embodiments, despite using the service inquiry to form a network connection with a sending device, the receiving device may continue the process of seeking other available devices with which to form a network connection to access a given service. This scanning operation can be halted after a given time (e.g., 5 seconds, 10 seconds, etc.). Note that while scanning for other devices a given device can discover devices that are already recorded as providing a service and can skip these devices. In addition, the remaining time for scanning for other devices can be reduced as each device is found (using the traditional technique or using the operations in the described embodiments).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for forming a network connection, comprising:
in a first electronic device:
determining that a network connection is to be made to at least one other electronic device to access a service on the other electronic device;
searching for available electronic devices that provide the service;
receiving a request from a second electronic device, the second electronic device being an available electronic device, to access a related service provided by the first electronic device, wherein the request is received on a network connection formed by the second electronic device between the second electronic device and the first electronic device; and
using information about the network connection between the second electronic device and the first electronic device acquired from the received request, and without finding the second electronic device during the searching for available electronic devices, communicating with the second electronic device and accessing the service on the second electronic device using the network connection between the second electronic device and the first electronic device.

2. The method of claim 1, wherein searching for available electronic devices involves performing a scan by, in a predetermined sequence of frequencies in a scan channel, repeatedly:
hopping to a next frequency;
sending an inquiry message at the frequency; and
awaiting a response from another electronic device at the frequency for a predetermined time.

3. The method of claim 1, further comprising, upon using the network connection formed by the second electronic device to communicate with the second electronic device, stopping the search for available electronic devices.

4. The method of claim 1, further comprising, while using the network connection formed by the second electronic device to communicate with the second electronic device, continuing to search for other available electronic devices that provide the service.

5. The method of claim 1, wherein communicating with the second electronic device using the network connection between the second electronic device and the first electronic device using information about the network connection between the second electronic device and the first electronic device acquired from the received request involves:
determining that the request is directed to the related service provided by the first electronic device;
determining at least one device identifier for the second electronic device from the request; and
using the determined device identifier to communicate with the second electronic device.

6. The method of claim 1, wherein communicating with the second electronic device comprises sending a request to the second electronic device to access the service on the second electronic device.

7. The method of claim 1, wherein a service includes one of a service provided by an application or an operating system on an electronic device or a profile provided by an electronic device, and wherein receiving the request involves receiving a service discovery request to access at least one of a service or a profile provided by the first electronic device.

8. The method of claim 1, wherein forming the network connection involves configuring one or more subsystems in a first electronic device to communicate with at least one other electronic device.

9. The apparatus of claim 1, wherein when forming the network connection, the processing subsystem is configured to configure one or more subsystems in a first electronic device to communicate with at least one other electronic device.

10. An apparatus for forming a network connection, comprising:
a processing subsystem; and
a networking subsystem coupled to the processing subsystem;
wherein the processing subsystem is configured to receive a first request to form a network connection with at least one other electronic device to access a service on the other electronic device;
wherein in response to receiving the first request, the processing subsystem is configured to cause the networking subsystem to search for available electronic devices that provide the service; and
wherein, upon receiving a second request from a second electronic device to access a related service provided by the first electronic device on a network connection formed by the second electronic device between the second electronic device and the first electronic device, the second electronic device being an available electronic device, and without finding the second electronic device during the search for available electronic devices, the processing subsystem is configured to use information about the network connection between the second electronic device and the first electronic device acquired from the second request to communicate with the second electronic device and access the service on the second electronic device using the network connection between the second electronic device and the first electronic device.

11. The apparatus of claim 10, wherein when searching for available electronic devices, the networking subsystem is configured to perform a scan by, in a predetermined sequence of frequencies in a scan channel, repeatedly:
hopping to a next frequency;
sending an inquiry message at the frequency; and
awaiting a response from another electronic device at the frequency for a predetermined time.

12. The apparatus of claim 10, wherein upon using the network connection formed by the second electronic device to communicate with the second electronic device, the processing subsystem is configured to stop the networking subsystem from searching for available electronic devices.

13. The apparatus of claim 10, wherein while using the network connection formed by the second electronic device to communicate with the second electronic device, the processing subsystem is configured to cause the networking subsystem to continue to search for other available electronic devices that provide the service.

14. The apparatus of claim 10, wherein when using the information about the network connection between the second electronic device and the first electronic device acquired from the second request to communicate with the second electronic device using the network connection between the second electronic device and the first electronic device, the processing system is configured to:

determine that the second request is directed to the related service provided by the first electronic device;

determine at least one device identifier for the second electronic device from the second request; and use the determined device identifier to communicate with the second electronic device.

15. The apparatus of claim 10, wherein when communicating with the second electronic device, the processing subsystem is configured to send a third request to the second electronic device to access the service on the second electronic device.

16. The apparatus of claim 10, wherein a service includes one of a service provided by an application or an operating system on an electronic device or a profile provided by an electronic device, and wherein when receiving the second request, the processing subsystem is configured to receive a service discovery request to access at least one of a service or a profile provided by the first electronic device.

17. A networking subsystem in an electronic device, comprising:

a controller; and a radio coupled to the controller;

wherein the controller is configured to:

cause the radio to perform a search operation to find one or more other available electronic devices that provide a service;

upon receiving a request from an unknown other electronic device to access the service for which the controller is searching, the other electronic device being an available electronic device, determine an identification of the other electronic device from the request; and use the determined identification to communicate with the other electronic device and accesses the service on the other electronic device on a network connection that the other electronic device formed with the electronic device without finding the other electronic device during the search operation.

18. An electronic device, comprising:

a networking subsystem;

wherein while performing a search for other electronic devices that provide a service, the networking subsystem is configured to monitor for incoming requests from other electronic devices that request access to the service; and wherein in response to receiving a request from another electronic device that is one of the other electronic devices to access the service, the networking subsystem is configured to use information about the other electronic device determined from the request to communicate with the other electronic device and access the service on the other electronic device on a network connection previously established by the other electronic device without finding the other electronic device during the search for the other electronic devices.

19. The electronic device of claim 18, wherein when communicating with the other electronic device using a network connection, the networking subsystem is configured to repeatedly:

hop to a next frequency in a predetermined sequence of frequencies in a channel; and for a predetermined time, monitor for communications from and send communications to the other electronic device at the frequency.

20. The electronic device of claim 19, wherein when previously establishing the network connection, the other electronic device is configured to perform one or more operations to determine the predetermined sequence of frequencies on which the networking subsystem is configured to monitor for communications.

* * * * *